Patented Dec. 15, 1936

2,064,292

UNITED STATES PATENT OFFICE 2,064,292

COMPOSITION OF MATTER

William Hale Charch, Buffalo, N. Y., assignor by mesne assignments, to E. I. du Pont de Nemours & Company, Wilmington, Del., a corporation of Delaware No Drawing. Application January 18, 1934, Serial No. 707,112

18 Claims. (Cl. 134—79)

This invention relates to a composition of matter and to the process of utilizing said composition as well as the product made therefrom.

Prior to the instant invention, when lacquers containing waxes were applied and dried at relatively low temperatures, for example, below the melting point of the waxes in the composition and specifically at room temperature, there was deposited a film which was not glass-clear. On the contrary, the film was either translucent or opaque. In many instances, also, the film was translucent or opaque due to separation of the wax in the film.

Recently, there has been devised a method wherein glass-clear, transparent coatings can be secured from lacquers containing waxes. This process contemplates subjecting the lacquer, after the application thereof to any suitable support or base, to a temperature at least equal to the melting point of the wax in the composition. Such a procedure, due to the treatment at the elevated temperature necessary to produce the glass-clear, transparent coating, obviously cannot be applied to objects which are adversely affected by the high temperatures. In many instances, after the process is utilized in connection with certain bases, subsequent operations are necessary to produce commercially satisfactory and practical materials. Thus, in the production of moisture-proof regenerated cellulose sheeting, the base of regenerated cellulose is dried to such a degree that it becomes more or less brittle and a subsequent treatment is generally required to restore or impart sufficient flexibility thereto to make a satisfactory, practical and commercial material.

Furthermore, in the aforementioned process when the compositions are applied to certain bases, particularly those which are thermoplastic and the coatings dried at an elevated temperature while the base is under tension, there may be some stretching or distortion. Another serious disadvantage of the previously referred to process results from the necessity of substantially immediately drying the coated material after the application of the lacquer. Because of this, the process is frequently inapplicable, or inconveniently applicable to discontinuous articles and, consequently, it may not be satisfactorily carried out in apparatus where the drier is more or less remote from the solution-applying mechanism. Still further, the process is not adapted to be carried out intermittently as, for example, coating the desired base and then at some later time subjecting it to the elevated temperature. Such procedure would not produce the desired glass-clear transparent coatings.

I have found that a composition comprising a cellulose derivative of the type hereafter more fully explained, and a wax, with or without a gum or resin, with or without a plasticizer, with or without coloring agents such as dyestuffs, and a solvent in which the ingredients are all soluble in the cold, as, for example, room temperature, will give a glossy, glass-clear, transparent and, preferably also, moistureproof film when dried at temperatures substantially below the melting point of the wax in the composition, and preferably at room temperatures. Because of these characteristics the instant invention will overcome the disadvantages of the prior art procedure. The composition contemplated by the instant invention may be used with materials and objects adversely affected by exposure to heat or on materials difficult to expose promptly to heat. The composition is suitable for coating machinery, electrical equipment, motors, chairs and furniture in general. Likewise, the composition may be cast in the usual manner to form self-sustaining films which are, in addition to being thin, flexible, non-tacky, transparent and preferably also moistureproof, of sufficient strength to withstand the rough usage which such a material may be subjected to if used as a wrapping tissue. The composition may also be applied as a coating to divers bases, such as sheets or films of regenerated cellulose, sheets or films formed of cellulose derivatives, such as glycol cellulose, cellulose nitrate, cellulose acetate, cellulose ethers, etc., sheets or films formed of an albuminous material, such as gelatin, casein, etc., papers including opaque papers, transparent papers, chemically treated papers, papers which have been partially or wholly gelatinized and/or regenerated, fabrics, etc., for the purpose of rendering the base material moistureproof. When the base is of a transparent material, since the coating is also transparent, the final product is likewise transparent. The other desirable characteristics of the bases employed are in no wise impaired. On the contrary, in some cases one or more of the desirable properties of the base may be enhanced.

The method constituting another phase of this invention permits coating and moistureproofing of materials which would be adversely affected by the high drying temperatures of the prior art. It is also applicable for coating discontinuous articles and capable of being used intermittently as, for example, in procedures where the coating-applying mechanism and the drying apparatus, if any, are more or less remote from each other.

The composition of matter constituting one phase of the instant invention may be generally classified in four groups, the constituents of which consist of the following:

(1) Cellulose derivative of the type hereafter more fully explained, wax and solvent;

(2) Cellulose derivative of the type hereafter more fully explained, wax, plasticizer and solvent;

(3) Cellulose derivative of the type hereafter more fully explained, wax, resin or blending agent and solvent;

(4) Cellulose derivative of the type hereafter more fully explained, wax, resin or blending agent, plasticizer and solvent.

If desired, a suitable coloring agent, such as a dyestuff or pigment, may be incorporated in each of the preceding compositions.

As the cellulose derivative, the invention contemplates that type which is soluble in such solvents as benzene or toluene, alone or in any of these solvents when admixed with not more than 10% by volume of an oxygen-containing solvent. The cellulose derivative is also restricted to that type which is co-soluble with the wax in the solvent or solvent mixture employed for the wax in the final composition. The criterion of co-solubility with the wax is to be applied below the melting point of the wax or wax-like body, and these mixtures are such that a clear transparent film can be deposited from these solutions below the melting point of the wax. Specific illustrative examples of cellulose derivatives which have given satisfactory results are found in the following classes: The cellulose esters of more than two carbon fatty acids, such as cellulose propionate, cellulose butyrate, etc., cellulose esters of a mixture of fatty acids, such that the combined carbon content of the ester portion of the molecule will be equivalent to at least a three carbon acid ester, for example cellulose acetate butyrate, cellulose formate-caproate, or the like. Cellulose ethers, such as ethyl cellulose, benzyl cellulose, butyl cellulose, mixed ethers, such as ethyl benzyl cellulose, or mixed ether esters of cellulose, have also given satisfactory results. In the preferred embodiment, a cellulose derivative of low viscosity characteristics is used. It is to be understood that the reduction in viscosity should not be accomplished at too great a sacrifice in strength.

As the wax constituent, paraffins, waxes, other wax-like materials or synthetic wax products, appreciably soluble in benzene or toluene, at temperatures below their melting points, are contemplated. Paraffin wax, such as paraffin wax of a high melting point, for example, paraffin wax having a melting point of approximately 60° C., is preferred. It is to be understood, however, that the lower melting point paraffins can be successfully used and that even petroleum jelly, ceresin or any other of the true waxes may be used, either alone or in combination with each other. It is frequently advantageous to include materials which will improve the compatibility of the cellulose derivative and the waxy substance. Such materials are referred to as blending agents and are usually resinous, although this is not essential. When the blending agent is resinous, advantage may be taken of its film-forming characteristics, if any, and sufficient quantity may be added to contribute towards the body and build of the coating composition or film in addition to the blending action.

With respect to that embodiment of the composition which includes a resin or blending agent, the criterion for choice of resin is its solubility in the same solvent or solvent mixture as serves to define the cellulose derivative above mentioned. Gum dammar has given very satisfactory results, but other gums, such as ester gums, gum mastic or certain of the synthetic resins, may be used with excellent results. Among the non-resinous materials which may serve as blending agents may be mentioned hydrogenated castor oil, castor oil phthalate, diethylene glycol rosinate, lanum or wool grease, or the like. The resins or blending agents may be used singly or in combination with each other, as desired.

A plasticizer or softener may, preferably in certain formulations, constitute one of the ingredients of the composition. The softener most suitable for this composition is that which has a relatively high boiling point or is a latent solvent for the cellulose derivative and which is also a solvent for the wax used, particularly at the temperature at which the film is to be deposited. In the preferred embodiment, the plasticizer is of such a nature or type that it is capable of dissolving appreciable quantities of the wax at temperatures below the melting point of the wax and/or characterized in that it shows complete miscibility with the melted wax and/or contains no oxygen.

As the solvent for the final coating or casting composition, the invention contemplates that type in which both the cellulose derivative and wax, and also the gums or resins, and plasticizers when used, are soluble in the cold and from which clear transparent films can be cast or formed at low temperatures. The hydrocarbon solvents of low or intermediate boiling points, for example, petroleum fractions, ligroin, gasoline, solvent naphtha and the like, and benzene, toluene and other hydrocarbons or partially or completely hydrogenated aromatic hydrocarbons constitute one class of desirable solvents. The halogenated hydrocarbons of low or intermediate boiling points, especially the halogenated derivatives of acetylene, ethylene, methane and ethane, or halogenated aromatics, comprise a second group of solvents to which the term "hydrocarbon solvent" may be applied. It is to be understood that the solvents aforementioned or their equivalents may be used singly or in combination with each other as desired. Generally, a mixed solvent will be employed.

When it is desired to hasten the drying of the film or increase the solvent power of the solvent on the cellulose derivative, there may be added to the aforementioned solvents or mixtures thereof a minor quantity of the alcoholic, aldehydic, ketonic, ester or ether class, or mixtures thereof. The quantity of such added oxygen-containing solvents should be so small as to neither precipitate the wax from the solution nor cause the deposition of waxy crystallites or translucences when the films or coatings are deposited from the solvents at temperatures substantially below the melting point of the wax in the composition. Satisfactory results are secured when the quantity of the oxygen-containing solvents is not over 30%, and preferably approximately 10% or less, of the total solvent.

The solvent system will obviously be chosen with due regard to the properties of the base to which the composition is to be applied.

The proportions of the different constituents constituting the composition may vary within wide limits. The proportion of the cellulose derivative should be such that it will comprise at least 50% of the total weight of the finished film. It may constitute 70%–80% or more of the film.

The amount of wax will vary with the properties of the cellulose derivative used and the use to which the films are destined. For best results, the ratio of wax to cellulose derivative usually need not be higher than 1:20 and a smaller ratio may be advantageously used with certain cellulosic derivatives. In general, the quantity of wax does not constitute more than 10% of the film and, in its preferred embodiment, constitutes not over 5% of the total non-volatile ingredients.

The ratio of softener to cellulose derivative may be as high as 1:2 or as low as 1:8, or lower, depending on the nature of the softener and the cellulose derivative with which it is used. The ratio will be determined partly by the amount of wax in the final film. It has been found most desirable to maintain a ratio between wax and softener not in excess of 10–15 parts of softener to 1 part of wax, though much smaller ratios may ofttimes be advantageously used. In general, the amount of softener or plasticizer will be less than 30–35% by weight, based on the solid film constituents, the plasticizer being considered a solid. For optimum results, the total weight of the softener and wax should be kept below 25% of the total weight of the finished film.

The quantity of resin or blending agent should not exceed 30% of the total solids. Satisfactory results, in so far as strength and transparency are concerned, are secured when the quantity of resin or blending agent is less than 20% by weight of the total solids. From the moisture-proofing point of view, the resin or blending agent and the softener are in a measure interchangeable as both in their physical combination with the wax enhance to a degree the moisture-resistant qualities of the film or coating. The combined weight of resin or blending agent and softener will not be more than 50% of the total weight of the film.

The quantity of solvent which may be used, of course, is dependent upon the destined use of the film deposited from the composition. Solutions containing from 5%–25% of solids have given satisfactory results.

The composition may be prepared in any suitable or appropriate manner. All the solid ingredients may be dissolved in the solvent, or one or more of the ingredients may be separately dissolved in portions of the solvent and the resultant solution combined to form the final solution.

As previously mentioned, the composition may be employed for casting films or as a coating composition. When used in casting, the films may be from 0.0005 to 0.005, and preferably 0.001, inch in thickness. When used as a coating, for example, on sheets or films of regenerated cellulose approximately .0009 inch thick, satisfactory results are secured when the coating (one side) is 0.00002–0.0001, and preferably 0.00005, inch thick.

In casting films from certain of these compositions, it has been found that said films are transparent as long as they adhere to the casting surface, but upon removal therefrom may develop a surface bloom of waxy quality. This, however, is not serious, since the waxy bloom may, in accordance with the invention, be removed by polishing, wiping or buffing the surface of the film, for example, by passing the film continuously through buffer rolls, brushes or other polishing devices. The polished film is transparent and of high luster. Its flexibility and dryness to touch are not impaired. Its strength is high and above all the degree of moistureproofness is as high as before polishing.

Films or coatings prepared from the instant composition may be given a further heat treatment after drying, regardless of the temperature at which the drying was effected. Such a treatment may consist in passing the film continuously through a heated chamber or around several warm rolls as, for instance, to effect a final smoothing off of the surface of the film and/or to enhance the moistureproofness of the film.

In order to more fully explain the invention, several illustrative examples are hereinafter set forth:

*Example I.*—A solution containing 10%–20% of the following ingredients in approximately the proportions given is prepared in a solvent mixture consisting of 70 parts by weight of chloroform and 30 parts by weight of ligroin (petroleum fraction boiling point 55° C.–70° C.):

| | Parts |
|---|---|
| Ethyl cellulose | 40 |
| (This is commercial ethyl cellulose containing between 2 and 3 ethyl groups per $C_6$ nucleus. It is soluble in benzene, toluene, tetrachlorethane, etc. without addition of alcohol) | |
| Paraffin wax (M. P. 60° C.) | 2 |
| (A high grade paraffin) | |

When this solution is cast in the usual manner and the film dried at room temperature in a relatively quiet atmosphere for about 18–20 hours, a non-tacky, flexible, strong, transparent film is secured which is admirably suitable for wrapping use.

*Example II.*—The following ingredients in approximately the proportions set forth are dissolved in a mixture of 70 parts of trichlorethane and 30 parts of ligroin to form a solution of suitable viscosity, for example, containing 10%–20% by weight of total solids:

| | Parts |
|---|---|
| Ethyl cellulose | 40 |
| (Same as in Example I) | |
| Paraffin wax (M. P. 60° C.) | 2 |
| Dixylyl ethane | 10 |
| (A high boiling softener) | |

This solution is very clear and free from waxy deposits at temperatures well below that of the ordinary room. Films or coatings formed therefrom in the usual manner dry quite rapidly even at room temperatures. The films are transparent, strong, pliable, non-tacky and admirably suited for wrappings, linings and similar uses.

In the production of films, if the film is stripped too soon from the casting surface a bloom of wax may appear upon its surface. In such a case the film is buffed, wiped or polished, whereby the bloom is eliminated and none of the other desirable characteristics impaired. Instead of drying the films at room temperature, they may be dried at higher temperatures with a consequent saving in time and greater efficiency in the recovery of the solvents.

*Example III.*—The following ingredients in approximately the proportions given are dissolved in a 70-30 mixture by weight of chloroform and ligroin to form a solution wherein the solid ingredients comprise from 10%-20% thereof:

| | Parts |
|---|---|
| Ethyl cellulose | 40 |
| (As in Example I) | |
| Paraffin wax (M. P. 60° C.) | 2 |
| (As in Example I) | |
| Gum dammar | 15 |
| (This is the gum of commerce which has been dewaxed) | |

Films cast from this solution were dried at approximately 25° C. in approximately 24 hours. The speed of drying was increased and any tendency toward bubbling was removed by replacing 10% of the ligroin in the solvent by acetone. Films made from such a solution dried within 6 hours and were flexible, transparent and highly moistureproof.

*Example IV.*—The following ingredients are dissolved in a 90-10 mixture of carbon tetrachloride and acetone to form a solution containing 10%-20% by weight thereof:

| | Parts |
|---|---|
| Ethyl cellulose | 100 |
| (Low viscosity, 33% C₂H₅ by Zeisel determinations) | |
| Paraffin wax (M. P. 60° C.) | 3 |
| Dixylyl ethane | 20 |

The films cast from this solution dried at room temperature in approximately 5 hours. The films were soft, pliable, clear and transparent.

*Example V.*—The following ingredients are dissolved in a solvent containing 50% toluene, 10% acetone and 40% xylene to give a solution containing 10% of benzyl cellulose:

| | Parts |
|---|---|
| Benzyl cellulose | 100 |
| (This was a moderately low viscosity material, analyzing approximately 2 benzyl groups per C₆ cellulose nucleus) | |
| Paraffin wax (M. P. 60° C.) | 3 |
| Dixylyl ethane | 25 |
| Synthetic resin from polystyrene, such as is sometimes sold under the trade name "Victron" | 10 |

The films cast from this solution dried in from approximately 40 minutes to 6 hours at 25° C. The films were transparent and flexible. When the solution is applied as a coating to sheets or films of regenerated cellulose, a glass-clear coating was secured.

*Example VI.*—The following ingredients in approximately the proportions set forth are dissolved in a 70-30 mixture of chloroform and ligroin to give a very fluid solution at room temperature:

| | Parts |
|---|---|
| Cellulose tributyrate | 80 |
| (Low viscosity) | |
| Paraffin wax (M. P. 60° C.) | 2 |
| Gum dammar | 20 |
| Dixylyl ethane | 5 |

Films produced from this solution were very clear, flexible and moistureproof.

*Example VII.*—The following ingredients in approximately the proportions set forth are dissolved in a 75-25 carbon tetrachloride-acetone mixture:

| | Parts |
|---|---|
| Cellulose Acetobutyrate | 100 |
| (Tri-ester about half butyrate, half acetate, medium viscosity in chloroform) | |
| Paraffin wax (M. P. 60° C.) | 3 |
| Dixylyl ethane | 30 |

Films cast therefrom dried in approximately 2 hours at 25° C. The films were pliable, strong, transparent, nontacky and moistureproof.

*Example VIII.*—The following ingredients in approximately the proportions set forth are dissolved in a solvent composed of 70% benzene, 20% ligroin, 5% acetone and 5% of 1-4 diozan:

| | Parts |
|---|---|
| Ethyl cellulose | 80 |
| (2.1 ethyl groups per C₆ nucleus) | |
| Paraffin wax (M. P. 60° C.) | 3 |
| Gum dammar | 15 |
| Dixylyl ethane | 10 |

Upon casting, this solution produced films of goods strength, satisfactory flexibility, transparency and non-tackiness when dried at 25° C. The films were also highly water-resistant and moistureproof. They may be adapted to wrapping applications.

In the foregoing examples, the casting of the solution was particularly described. It is to be understood that the invention is not restricted thereto. As has been previously mentioned, the solutions after having been brought to the desired viscosity may be applied as a coating to divers materials and objects, and such coatings would in many instances serve to moistureproof the base.

As is apparent from the foregoing, the invention is contemplated for use in connection with drying the films or coatings at temperatures substantially below the melting point of the wax in the composition, and specially at room temperature of approximately 25° C. The composition herein described is capable of use with higher temperatures. For instance, the films or coatings may be dried at higher temperatures than the preferred low temperatures, and even at temperatures equal to or indeed higher than the melting point of the wax in the composition, such as, for example, 70° C. to 90° C. Drying at an elevated temperature in an atmosphere of low humidity and of controlled solvent vapor content may be very desirable in operating practice to increase speed of operation, to avoid blushing caused by deposition of water on the surface of the film, and to effect economically the recovery of the solvents.

As is apparent from the foregoing, the composition of matter produces coatings or films which are glass-clear, transparent, flexible, non-tacky and preferably also moisture-proof. In certain of the formulations, such as, for example, those set forth constituting the specific Examples, 2, 4, 5, 7, 8, the films and coated materials are truly heat-sealable; that is, when the films and coatings are of the thickness previously described and are heat-sealed, there will be produced a seal or joint which is stronger than that produced by heat sealing materials of the prior art such, for example, as that described in United States Patent No. 1,737,187.

The following test has been devised to determine and test the strength of the joints beforementioned.

Strips of the coated material 1.5 inches wide are superposed on one end, so that the opposite faces of the film are in contact. A seal is made across the width of the material by imposing thereon a heated iron weighing 1,500 grams for 2 seconds. The iron is so designed as to cause a seal to be made of a width of 3/32 of an inch, the iron being maintained in any suitable manner at a temperature above 130° C. and below 200° C. as, for instance 150° C. Two strips so sealed are opened at the free end and placed in a stretching device, such as a Suter testing machine, by gripping each end of the sheet in suitable clamps, one of which is fixed and the other of which is moved away at a constant speed of 12" per minute. The force in grams required to pull the sheets apart is taken as a measure of the strength of the bond and is referred to herein as "heat-sealing value".

For the purposes of this specification and claims, I define moistureproof materials as those which, in the form of continuous, unbroken sheets or films, permit the passage of not more than 690 grams of water vapor per 100 square meters per hour, over a period of 24 hours, at approximately 39.5° C.±0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental tests, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per 100 square meters per hour over a period of approximately 24 hours, at a temperature of 39.5° C.±0.5° C. (preferably 39.5° C.±0.25° C.), with a water vapor pressure differential of 50–55 mm. (preferably 53.4±0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing, it is apparent that under the conditions set forth, a moistureproofed regenerated cellulose sheet is capable of resisting the passage of moisture or water vapor therethrough at least ten times as effectively as the uncoated regenerated cellulose sheet.

It is to be understood that the term "cellulose derivative" or the specific cellulose derivative mentioned in the claims is of that type which is soluble in such solvents as benzene or toluene, alone or in any of the solvents when admixed with not more than 10% by volume of an oxygen-containing solvent.

Since it is obvious that various changes and modifications may be made in the above description without departing from the nature or spirit thereof, this invention is not restricted thereto except as set forth in the appended claims.

I claim:

1. A composition of matter comprising a cellulose derivative of the type which is soluble in benzene or toluene alone or in either of said solvents when admixed with not more than 10% by volume of an oxygen-containing solvent, a waxy substance, a plasticizer containing no oxygen and a solvent in which the ingredients are soluble, the ingredients being present in such amounts as to deposit a glossy, transparent and heat-sealable film upon evaporation of the solvent at a temperature substantially below the melting point of the waxy substance in the composition.

2. A composition of matter consisting essentially of a cellulose derivative of the type which is soluble in benzene or toluene alone or in either of said solvents when admixed with not more than 10% by volume of an oxygen-containing solvent, a waxy substance, a softening agent consisting of a plasticizer containing no oxygen and a solvent in which the ingredients are soluble, the ingredients being present in such amounts as to deposit a glossy, transparent and heat-sealable film upon evaporation of the solvent at a temperature substantially below the melting point of the waxy substance in the composition.

3. A composition of matter consisting essentially of a cellulose derivative of the type which is soluble in benzene or toluene alone or in either of said solvents when admixed with not more than 10% by volume of an oxygen-containing solvent, a waxy substance, a softener consisting of a plasticizer containing no oxygen and a solvent in which the ingredients are soluble, the ingredients being present in such amounts as to deposit a glossy, transparent and heat-sealable film upon evaporation of the solvent at a temperature substantially below the melting point of the waxy substance in the composition, the solvent being of the class which consists of hydrocarbons, halogenated hydrocarbons and mixtures thereof, said solvent also containing not over approximately 30% of an oxygen-containing solvent.

4. A composition of matter comprising a cellulose derivative of the type which is soluble in benzene or toluene alone or in either of said solvents when admixed with not more than 10% by volume of an oxygen-containing solvent, a waxy substance, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the ingredients being present in such amounts as to deposit a glossy, transparent and heat-sealable film upon evaporation of the solvent at a temperature substantially below the melting point of the waxy substance in the composition.

5. A composition of matter consisting essentially of a cellulose derivative of the type which is soluble in benzene or toluene alone or in either of said solvents when admixed with not more than 10% by volume of an oxygen-containing solvent, a waxy substance, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the ingredients being present in such amounts as to deposit a glossy, transparent and heat-sealable film upon evaporation of the solvent at a temperature substantially below the melting point of the waxy substance in the composition, the solvent being of the class which consists of hydrocarbons, halogenated hydrocarbons and mixtures thereof, said solvent also containing not over approximately 30% of an oxygen-containing solvent.

6. A composition of matter comprising a cellulose derivative of the type which is soluble in benzene or toluene alone or in either of said solvents when admixed with not more than 10% by volume of an oxygen-containing solvent, a waxy substance, dixylyl ethane and a solvent in which the ingredients are soluble, the ingredients being present in such amounts as to deposit a glossy, transparent and heat-sealable film upon evaporation of the solvent at a temperature substantially below the melting point of the waxy substance in the composition.

7. A composition of matter consisting essentially of a cellulose derivative of the type which is soluble in benzene or toluene alone or in either of said solvents when admixed with not more than 10% by volume of an oxygen-containing solvent, a waxy substance, dixylyl ethane and a solvent in which the ingredients are soluble, the ingredients being present in such amounts as to deposit a glossy, transparent and heat-sealable film upon evaporation of the solvent at a temperature substantially below the melting point of the waxy substance in the composition, the solvent being of the class which consists of hydrocarbons, halogenated hydrocarbons and mixtures thereof, said solvent also containing not over approximately 30% of an oxygen-containing solvent.

8. A composition of matter comprising a cellulose derivative of the type which is soluble in benzene or toluene alone or in either of said solvents when admixed with not more than 10% by volume of an oxygen-containing solvent, a waxy substance, a resin, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the ingredients being present in such amounts as to deposit a glossy, transparent and heat-sealable film upon evaporation of the solvent at a temperature substantially below the melting point of the waxy substance in the composition.

9. A composition of matter comprising a cellulose derivative of the type which is soluble in benzene or toluene alone or in either of said solvents when admixed with not more than 10% by volume of an oxygen-containing solvent, a waxy substance, a plasticizer, a resin of the hydrocarbon type and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the ingredients being present in such amounts as to deposit a glossy, transparent and heat-sealable film upon evaporation of the solvent at a temperature substantially below the melting point of the waxy substance in the composition.

10. A composition of matter consisting essentially of a cellulose derivative of the type which is soluble in benzene or toluene alone or in either of said solvents when admixed with not more than 10% by volume of an oxygen-containing solvent, a waxy substance, a plasticizer, a resin of the hydrocarbon type and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the ingredients being present in such amounts as to deposit a glossy, transparent and heat-sealable film upon evaporation of the solvent at a temperature substantially below the melting point of the waxy substance in the composition, the solvent being of the class which consists of hydrocarbon, halogenated hydrocarbons and mixtures thereof, said solvent also containing not over approximately 30% of an oxygen-containing solvent.

11. A composition of matter consisting essentially of a cellulose derivative of the type which is soluble in benzene or toluene alone or in either of said solvents when admixed with not more than 10% by volume of an oxygen-containing solvent, a waxy substance, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the cellulose derivative constituting over 70% of the solids in the composition, the ratio of plasticizer to cellulose derivative being 1 part of plasticizer to 2–8 parts of cellulose derivative and the ratio of waxy substance to plasticizer being 1 part of waxy substance to 10–15 parts of plasticizer, said solution depositing a glossy, transparent and heat-sealable film upon evaporation of the solvent at a temperature substantially below the melting point of the waxy substance in the composition.

12. A composition of matter consisting essentially of a cellulose derivative of the type which is soluble in benzene or toluene alone or in either of said solvents when admixed with not more than 10% by volume of an oxygen-containing solvent, a waxy substance, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the waxy substance being present in an amount not exceeding 10% by weight of the total solids in the composition, and the ingredients being present in such amounts as to deposit a glossy, transparent and heat-sealable film upon evaporation of the solvent at a temperature substantially below the melting point of the waxy substance in the composition.

13. A composition of matter consisting essentially of a cellulose derivative of the type which is soluble in benzene or toluene alone or in either of said solvents when admixed with not more than 10% by volume of an oxygen-containing solvent, a waxy substance, a resin, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the resin being present in an amount not exceeding 30% by weight of the total solids in the composition, and the ingredients being present in such amounts as to deposit a glossy, transparent and heat-sealable film upon evaporation of the solvent at a temperature substantially below the melting point of the waxy substance in the composition.

14. A composition of matter consisting essentially of a cellulose derivative of the type which is soluble in benzene or toluene alone or in either of said solvents when admixed with not more than 10% by volume of an oxygen-containing solvent, a waxy substance, a plasticizer and a solvent in which the ingredients are soluble, said plasticizer being characterized in that it contains no oxygen, is capable of dissolving appreciable quantities of the wax at temperatures below the melting point of the wax and is substantially completely miscible with the waxy substance in the molten state, the plasticizer being present in an amount not exceeding 33% by weight of the total solids in the composition, and the ingredients being present in such amounts as to deposit a glossy, transparent and heat-sealable film upon evaporation of the solvent at a temperature substantially below the melting point of the waxy substance in the composition.

15. A composition of matter consisting essentially of a solvent in which there is dissolved not less than approximately 70% of a cellulose derivative of the type which is soluble in benzene or toluene alone or in either of said solvents when admixed with not more than 10% by volume of an oxygen containing solvent, not less than approximately 2% of paraffin and not less than approximately 16% of dixylyl ethane, the percentages being by weight.

16. A composition of matter consisting of

| | Parts |
|---|---|
| Ethyl cellulose | 40 |
| (This is commercial ethyl cellulose containing between 2 and 3 ethyl groups per C$_6$ nucleus. It is soluble in benzene, toluene, tetrachloride, without the addition of alcohol) | |
| Paraffin wax (M. P. 60° C.) | 2 |
| Dixylyl ethane | 10 | dissolved in a solvent consisting of 70 parts of trichlorethane and 30 parts of ligroin to form a solution of the desired viscosity, said composition depositing a glossy, transparent, heat-sealable film upon the evaporation of the solvent at approximately room temperature.

17. A composition of matter consisting of

| | Parts |
|---|---|
| Cellulose acetobutyrate | 100 |
| (Tri-ester about half butyrate, half acetate, medium viscosity in chloroform) | |
| Paraffin wax (M. P. 60° C.) | 3 |
| Dixylyl ethane | 30 | dissolved in a solvent consisting of 75 parts of carbon tetrachloride and 25 parts acetone to form a solution of the desired viscosity, said composition depositing a glossy, transparent, heat-sealable film upon evaporation of the solvent mixture at approximately 25° C.

18. A composition of matter consisting of

| | Parts |
|---|---|
| Ethyl cellulose | 80 |
| (2.1 ethyl groups per C$_6$ nucleus) | |
| Paraffin wax (M. P. 60° C.) | 3 |
| Gum dammar | 15 |
| Dixylyl ethane | 10 | dissolved in a solvent consisting of 70 parts of benzene, 20 parts ligroin, 5 parts of acetone and 5 parts of 1–4 dioxan to form a solution of the desired viscosity, said composition depositing a glossy, transparent, heat-sealable film upon evaporation of the solvent mixture at approximately 25° C.

WILLIAM HALE CHARCH.